United States Patent
Masaki

(10) Patent No.: US 7,043,047 B1
(45) Date of Patent: May 9, 2006

(54) DIGITAL IMAGE PROCESSING APPARATUS

(75) Inventor: Kenji Masaki, Nagaokakyo (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/287,530

(22) Filed: Apr. 7, 1999

(30) Foreign Application Priority Data

Apr. 13, 1998 (JP) .................... 10-115868

(51) Int. Cl.
*G06K 9/00* (2006.01)

(52) U.S. Cl. ..................................... 382/100
(58) Field of Classification Search ............... 382/100; 380/51, 54; 345/589
See application file for complete search history.

(56) References Cited

U.S. PATENT DOCUMENTS

| | | | | |
|---|---|---|---|---|
| 5,005,011 A | * | 4/1991 | Perlman et al. | 340/728 |
| 5,287,360 A | * | 2/1994 | Regent | 370/112 |
| 5,530,759 A | * | 6/1996 | Braudaway et al. | 380/54 |
| 5,583,941 A | * | 12/1996 | Yoshida et al. | 380/51 |
| 5,721,788 A | * | 2/1998 | Powell et al. | 382/100 |
| 6,115,818 A | * | 9/2000 | Barton | 713/176 |
| 6,163,842 A | * | 12/2000 | Barton | 713/176 |
| 6,285,776 B1 | * | 9/2001 | Rhoads | 382/100 |
| 6,329,999 B1 | * | 12/2001 | Mitsushita et al. | 345/582 |
| 6,523,114 B1 | * | 2/2003 | Barton | 713/176 |
| 6,654,501 B1 | * | 11/2003 | Acharya et al. | 382/235 |
| 2001/0025341 A1 | * | 9/2001 | Marshall | 713/176 |
| 2004/0146160 A1 | * | 7/2004 | Nomizu et al. | 380/200 |

FOREIGN PATENT DOCUMENTS

| | | |
|---|---|---|
| JP | 07-307861 | 11/1995 |
| JP | 8-321941 | 12/1996 |

* cited by examiner

*Primary Examiner*—Barry Choobin
(74) *Attorney, Agent, or Firm*—Morrison & Foerster LLP

(57) ABSTRACT

Specific information such as the type of performed image processing, and date is disassembled to bits, and the resulting bits are placed, e.g., in the least significant bit positions of pixels within processed image data. By this arrangement, when image processing is performed on original image data, it can be determined from processed image data what processing was executed on the image data.

20 Claims, 9 Drawing Sheets

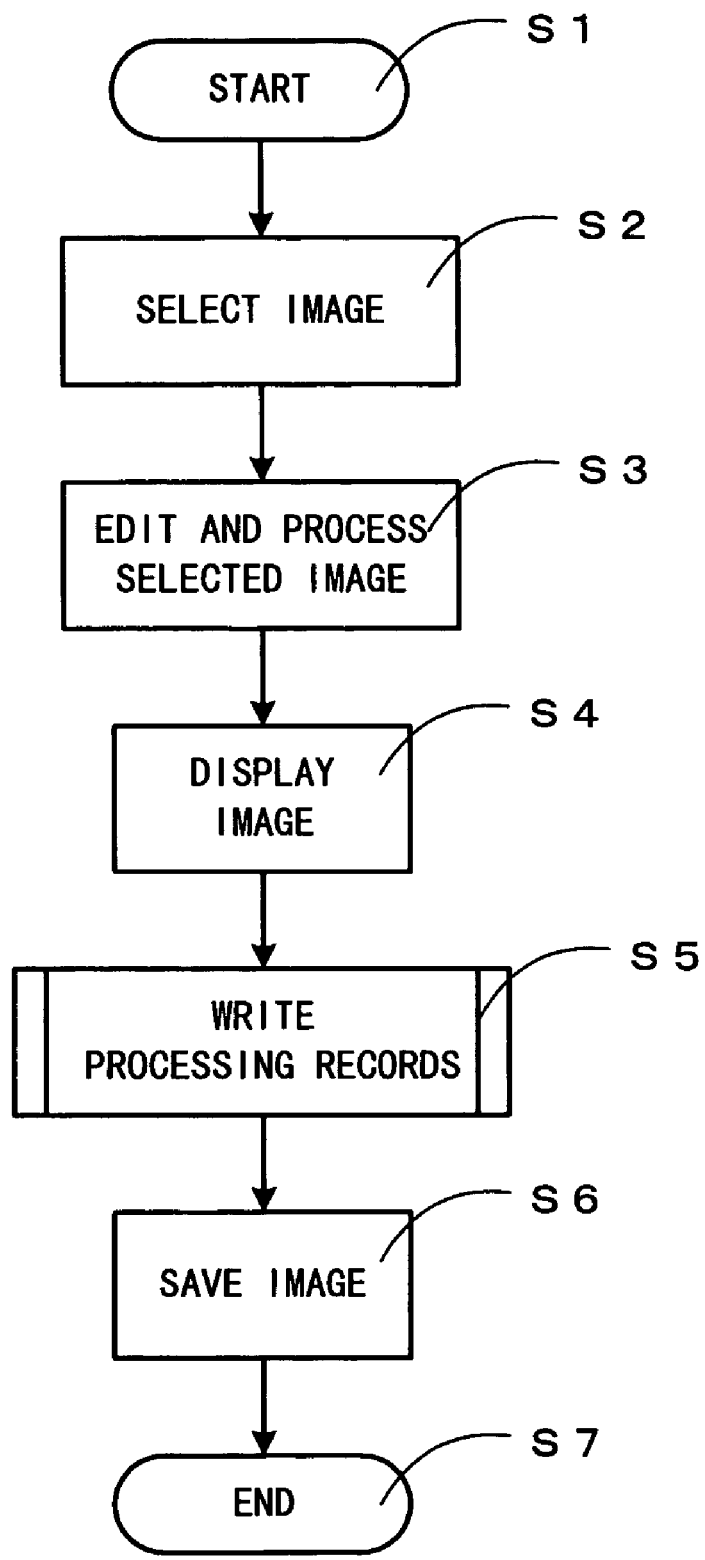

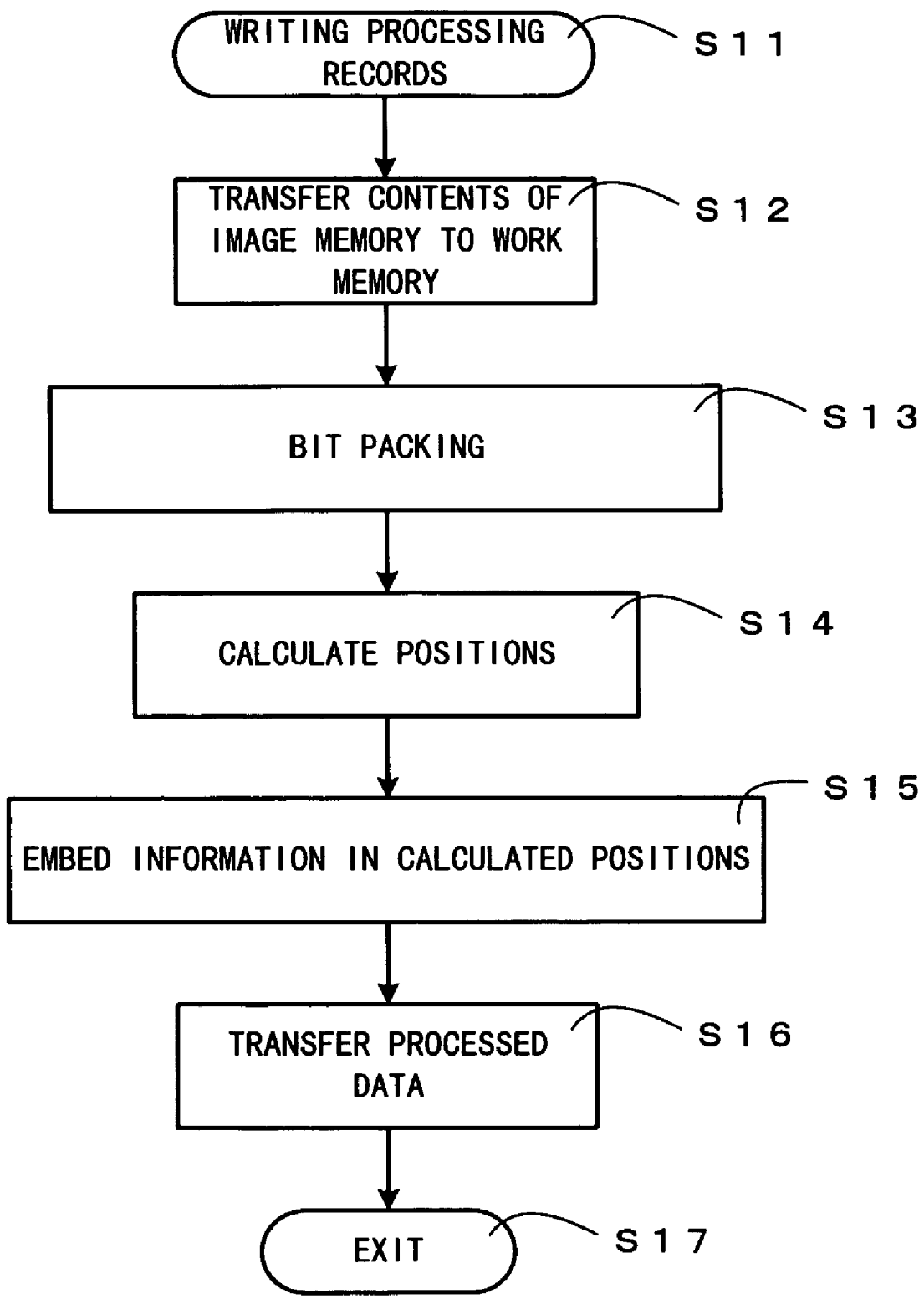

FIG. 3

| IMAGE PROCESSING | CODE |
|---|---|
| COLOR CORRECTION - METHOD 1 | 1 1 |
| COLOR CORRECTION - METHOD 2 | 1 2 |
| COLOR CORRECTION - METHOD 3 | 1 3 |
| COLOR CORRECTION - METHOD 4 | 1 4 |
| CONTRAST CORRECTION - METHOD 1 | 2 1 |
| CONTRAST CORRECTION - METHOD 2 | 2 2 |
| CONTRAST CORRECTION - METHOD 3 | 2 3 |
| CONTRAST CORRECTION - METHOD 4 | 2 4 |
| SHARPNESS CORRECTION METHOD - 1 | 3 1 |
| SHARPNESS CORRECTION METHOD - 2 | 3 2 |
| SHARPNESS CORRECTION METHOD - 3 | 3 3 |
| SHARPNESS CORRECTION METHOD - 4 | 3 4 |

FIG. 4

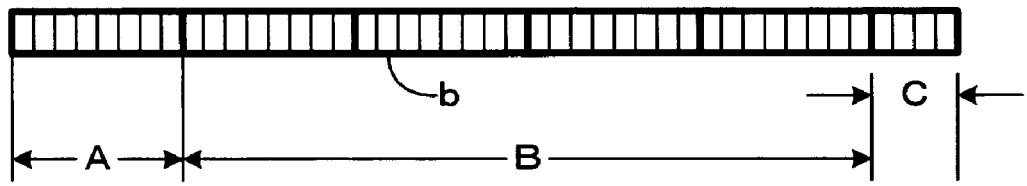

FIG. 5

| BIT | UNIT (H , V) |
|---|---|
| 1ST BIT | 1ST , 1ST |
| 2ND BIT | 2ND , 1ST |
| ⋮ | ⋮ |
| 44THD BIT | 2ND , 7TH |

FIG. 8

R PLANE

| BIT | UNIT (H , V) |
|---|---|
| 1ST BIT | 1ST C.P. , 1ST C.P. |
| 2ND BIT | 2ND C.P. , 1ST C.P. |
| ⋮ | ⋮ |
| 44TH BIT | 2ND C.P. , 7TH C.P. |

FIG. 9

G PLANE

| BIT | UNIT (H , V) |
|---|---|
| 1ST BIT | 1ST C.P. + 5 , 1ST C.P. + 5 |
| 2ND BIT | 2ND C.P. + 5 , 1ST C.P. + 5 |
| ⋮ | ⋮ |
| 44TH BIT | 2ND C..P. + 5 , 7TH C.P. + 5 |

FIG. 10

B PLANE

| BIT | UNIT (H , V) |
|---|---|
| 1ST BIT | 1ST C.P. − 5 , 1ST C.P. − 5 |
| 2ND BIT | 2ND C.P. − 5 , 1ST C.P. − 5 |
| ⋮ | ⋮ |
| 44TH BIT | 2ND C..P. − 5 , 7TH C.P. − 5 |

FIG. 11

R PLANE

| BIT | UNIT (H , V) |
|---|---|
| 1ST BIT | 1ST C.P. , 1ST C.P. |
| 2ND BIT | 2ND C.P. , 1ST C.P. |
| ⋮ | ⋮ |
| 47TH BIT | 5TH C.P. , 7TH C.P. |
| 48TH BIT | 6TH C.P. , 7TH C.P. |
| 49TH BIT | 7TH C.P. , 7TH C.P. |

FIG. 12

G PLANE

| BIT | UNIT (H , V) |
|---|---|
| 1ST BIT | 1ST C.P. + 5 , 1ST C.P. + 5 |
| 2ND BIT | 2ND C.P. + 5 , 1ST C.P. + 5 |
| ⋮ | ⋮ |
| 47TH BIT | 5TH C.P. + 5 , 7TH C.P. + 5 |
| 48TH BIT | 6TH C.P. + 5 , 7TH C.P. + 5 |
| 49TH BIT | 7TH C.P. + 5 , 7TH C.P. + 5 |

FIG. 13

B PLANE

| BIT | UNIT (H , V) |
|---|---|
| 1ST BIT | 1ST C.P. − 5 , 1ST C.P. − 5 |
| 2ND BIT | 2ND C.P. − 5 , 1ST C.P. − 5 |
| ⋮ | ⋮ |
| 47TH BIT | 5TH C.P. − 5 , 7TH C.P. − 5 |
| 48TH BIT | 6TH C.P. − 5 , 7TH C.P. − 5 |
| 49TH BIT | 7TH C.P. − 5 , 7TH C.P. − 5 |

PRIOR ART

DIGITAL IMAGE PROCESSING APPARATUS

This application is based on application No. H10-115868 filed in Japan, the contents of which are hereby incorporated by reference.

BACKGROUND OF THE INVENTION

1. Field of the Invention

This invention relates to the field of digital image processing.

2. Description of the Related Arts

Digital image processing techniques have major features of easy image editing and modifications.

FIGS. 16, 17, and 18 are conceptual diagrams showing the configuration of such prior art image automatic correction software.

Usually an editor (operator) performs various operations on an original image with the aid of such software, thereby obtaining a desired image in a trial and error fashion.

In such a process, an image at each step in which an original image is subjected to different processing as shown in FIG. 17 is saved, and if a desired image is not obtained by processing in one way, processing is often performed again from the beginning or performed on an intermediate image in a different way.

In the process of the operations, carefully making records of an original image pertaining to image data created at each step, information about processing on the images, and other information may avoid confusion, but an editor often concentrates attention to processing itself and neglects such recording, so that data at intermediate steps is disorderly accumulated, with the result that the intermediate data cannot be reused. For this reason, operations that have been heretofore performed often become meaningless.

In the case where a plurality of images are processed at a time as in automatic image correction software as shown in FIG. 18, the same problem as described above occurs since it cannot be determined what processing the program performed on each image.

Furthermore, also when image data is passed to different editors, the editors will perform similar operations because the history of the image data is not always clear.

Although an image produced as a result of image processing may be intuitively different from an original image thereof, it cannot be practically determined visually what processing has been performed to produce the image, what the original image was like, which of two pieces of data, if any, is the original image, and the like.

Presently, numerous file formats of images are proposed and some of them permit predetermined information to be written in advance in a predetermined area (tag) of a file. However, some file formats do not have such an area or have no area corresponding to information to be written; these formats are inconvenient to use because desired information cannot be recorded.

The U.S. Pat. No. 5,530,759 by Gordon et al discloses a system for placing a visible "watermark" on a digital image, wherein an image of the watermark is combined with the digital image.

The pixels of the watermark image are examined, and for each pixel whose value is not a specified "transparent" value, the corresponding pixel of the original image is modified by changing its brightness but its chromaticities. This results in a visible mark which allows the contents of image to be viewed clearly, but which discourages unauthorized use of the image.

The important matter of this patent is that the contents of image are visible and thereby the unauthorized use of the image is prevented.

SUMMARY OF THE INVENTION

An object of this invention, which is different from that of the Gordon's patent, is to solve the problem described above by arresting the recognition of written information by users, that is, reducing to a minimum a visible influence on images, and nevertheless by making it possible to determine what processing was performed on image data or when the processing was performed, from information of the image data itself.

In this invention, bits for describing information different from information of processed image data, obtained by image processing on original image data, are placed respectively in specific bit positions of pixel data at predetermined positions of the processed image. The specific bit positions are placed dispersively over the image surface and thereby information different from image information can be embedded in the image information without substantially influencing the quality of image.

According to this invention, the history of image processing on digital images can be saved in image data itself.

In the case where a plurality of images are processed at a time as in automatic image correction software, it cannot be determined with the prior art what processing the program performed on each piece of image data. However, according to this invention, information about the processing can be saved as a record.

Since the history of processing is recorded in image data itself according to this invention, an original image can be restored by reversing the processing.

Even if there are a number of similar images, according to this invention, the oldest image or an original image can be easily recognized from the history of processing.

According to this invention, since any information can be recorded, a picture date and names can be recorded and saved so that they are hidden from view.

According to this invention, since information can also be cryptographically recorded, although processing is heavily loaded, secret information can be thereby recorded.

According to this invention, since information is embedded in image data itself, different types of information can be recorded regardless of the formats of image files.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and together with the description, serve to explain the principles of the invention.

FIG. 1 is a flowchart for explaining the outline of this invention.

FIG. 2 is a subroutine flowchart showing the contents of a subroutine "Writing processing records" in FIG. 1.

FIG. 3 is a table showing the correspondences between image processing contents and code numbers representing them.

FIG. 4 is a diagram showing information embedded in image data—in this example, processing information, date information, and version information.

FIG. 5 is a table representing the image positions of pixels in which processing information is embedded.

FIG. 8 is a table showing, with respect to an R plane, the positions of pixels to which processing information is written in a second embodiment.

FIG. 9 is a table showing, with respect to a G plane, the positions of pixels to which processing information is written in a second embodiment.

FIG. 10 is a table showing, with respect to a B plane, the positions of pixels to which processing information is written in a second embodiment.

FIG. 11 is a table showing, with respect to an R plane, the positions of pixels to which processing information is written in a third embodiment.

FIG. 12 is a table showing, with respect to a G plane, the positions of pixels to which processing information is written in a third embodiment.

FIG. 13 is a table showing, with respect to a B plane, the positions of pixels to which processing information is written in a third embodiment.

DESCRIPTION OF THE PREFERRED EMBODIMENTS

Figure 14:
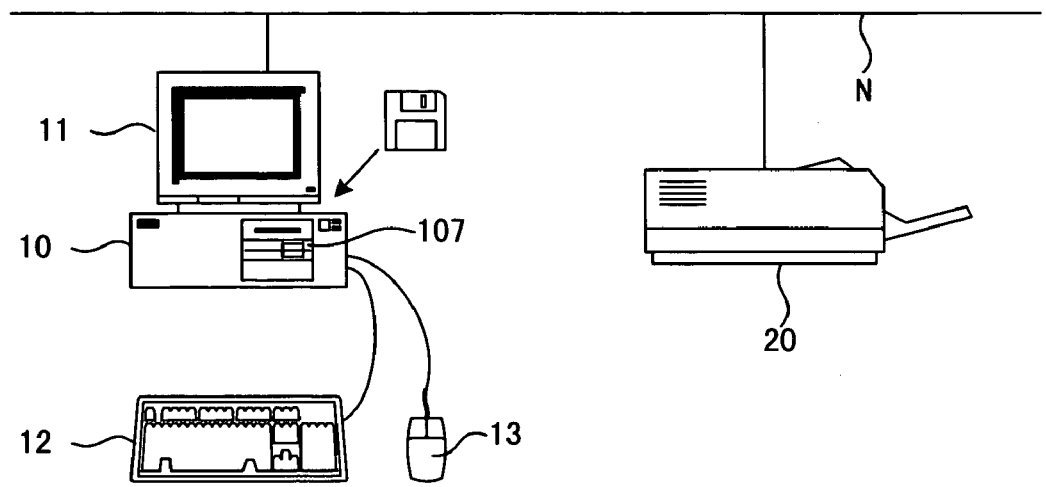
FIG. 14 is a system diagram for explaining the outline of this invention.

FIG. 14 is a system diagram for explaining the outline of this invention. To a computer 10, a display 11 is connected. Furthermore, a keyboard 12 and mouse 13 used for input are connected to the computer 10. The computer 10 has a front-mounted FD unit 107 for reading from and writing to a recording medium (flexible disk) 20. On the other hand, a printer for providing output from the computer 10 is connected via network N.

Figure 15:
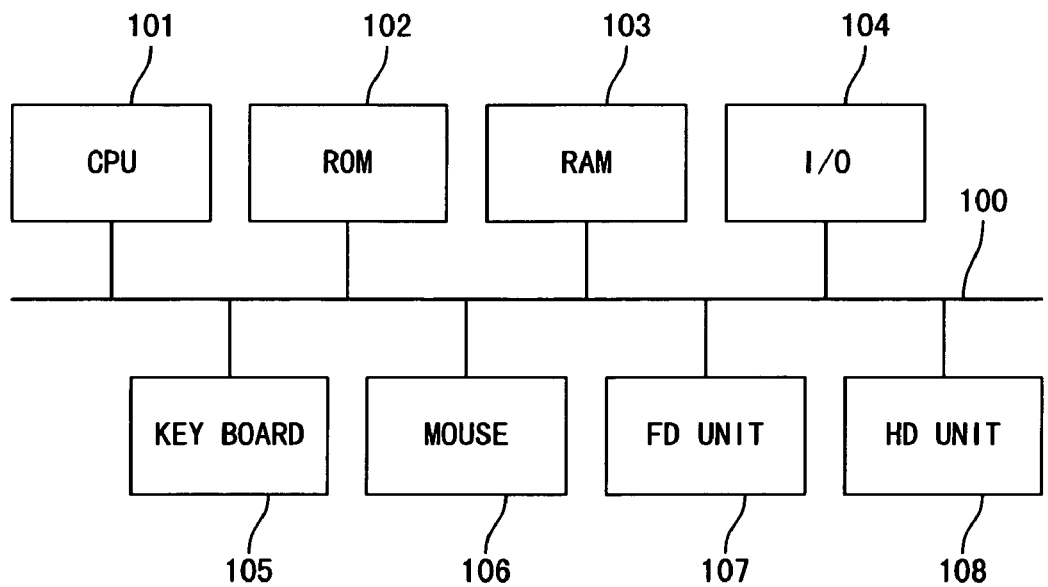
FIG. 15 is a diagram showing an internal configuration of a computer.
Figure 16:
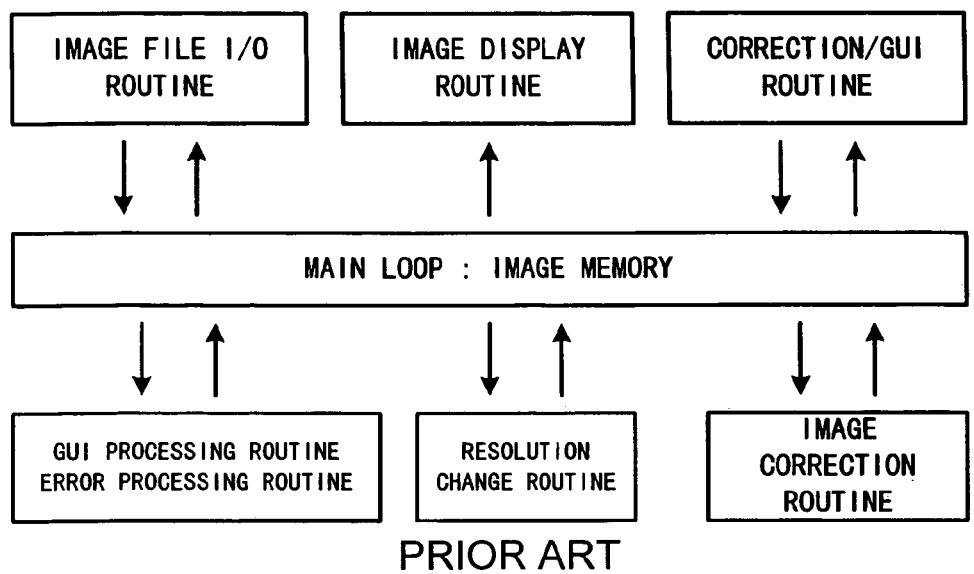
FIG. 16 is a conceptual diagram showing the configuration of prior art image automatic correction software.
Figure 17:
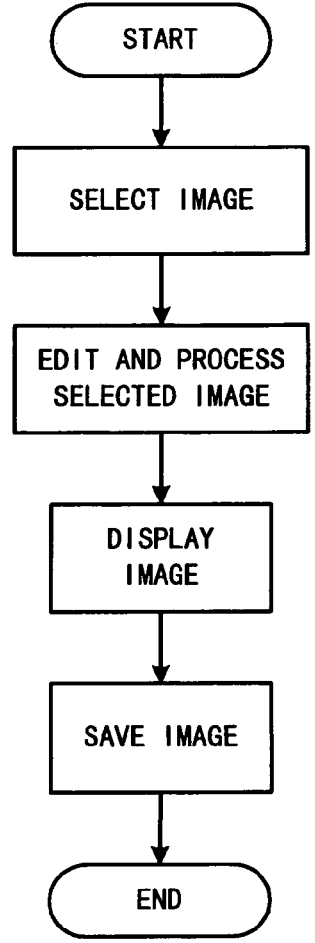
FIG. 17 is a diagram for explaining the flow of operations of prior art software that edits and processes a full color image on a personal computer.
Figure 18:
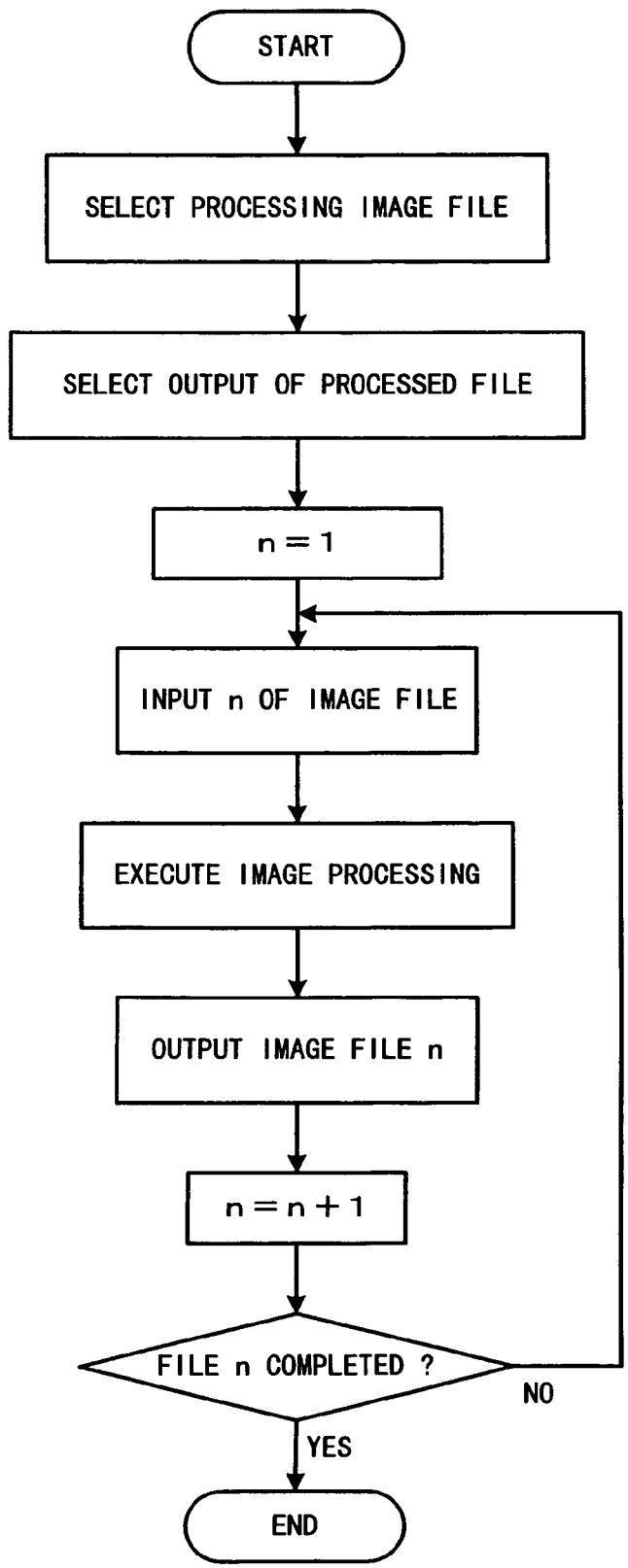
FIG. 18 is a diagram for explaining the flow of prior art software that processes a plurality of images at a time.

FIG. 15 is a block diagram showing an internal configuration of the computer.

In the interior of the computer 10, CPU 101, ROM 102, RAM 103, input-output port 104, keyboard 105, mouse 106, FD unit 107, and HD (hard disk) unit are connected via a bus 100.

The computer 10 singly or jointly executes a program stored in the ROM 102, and a program stored in the RAM 103, supplied from the flexible disk 20 or the network N. Image data to be edited is stored in the RAM 103 or HD unit 108.

First Embodiment

FIG. 1 is a flowchart for explaining the outline of this invention. This invention is provided with a subroutine "Writing processing records" as shown in the figure.

In this subroutine, necessary data is embedded in image data without substantially influencing the image. This method will be described later. The flowchart of FIG. 1 will be described.

This program, when started (step S1), in step S2, selects an image to be subjected to image processing. In step S3, the program edits and processes the selected image. The contents of the image processing vary depending on purposes. The program displays the processed image on a display unit (step S4), checks to see if it is as intended, proceeds to the subroutine "Writing processing records" (step S5), and writes a record of the contents of the performed image processing to image data. The program saves the image data to which processing contents are written (step S6), and terminates in step S7.

FIG. 2 is a subroutine flowchart showing the contents of the subroutine "Writing processing records" (step S5).

The subroutine "Writing processing records", when started (step S11), transfers the contents of image memory to a work memory. The subroutine performs bit packing on write data in step S13. The bit packing is performed as described below.

The contents of image processing are assigned code numbers that can be represented in one byte, as shown in the table of FIG. 3. For example, if the contents of image processing are contrast correction by method 2, a code of 22 in hexadecimal notation is assigned.

Date is represented by elapsed time, in minutes, from 0:0 a.m., Jan. 1, 1998. For this reason, 32 bits are used. Four-bit data is provided to check the version of processing history.

These information items are as shown in FIG. 4 when sequentially arranged. A is a portion indicating the contents of image processing, B is a portion indicating date, C is a portion indicating version check information, and b is a bit making up these items.

These bits are placed dispersively over the surface of an image subjected to image processing. The positions in which they are placed are calculated in step S14.

An image used in this example is a full-color natural image the size of which is 1280 by 1024 pixels. The positions of the 44 bits in the image are decided. The bits are embedded as described below with respect to each of the R, G, and B planes of the image.

The image is divided by 8 both in the horizontal and vertical directions into 64 (8×8) units, values with a fractional portion truncated. The central pixel both in the horizontal and vertical directions of each unit is used to embed information, and bit positions are decided as shown in the table of FIG. 5.

In each position, the 44-bit information is embedded in the least significant bit (LSB) positions of intensity data of each pixel.

Since a pixel position in which each of the 44 bits is placed is decide in this way, the subroutine proceeds to step S15.

In this step, the pixel data at the each position of the image is modified as follows.

Figure 6:
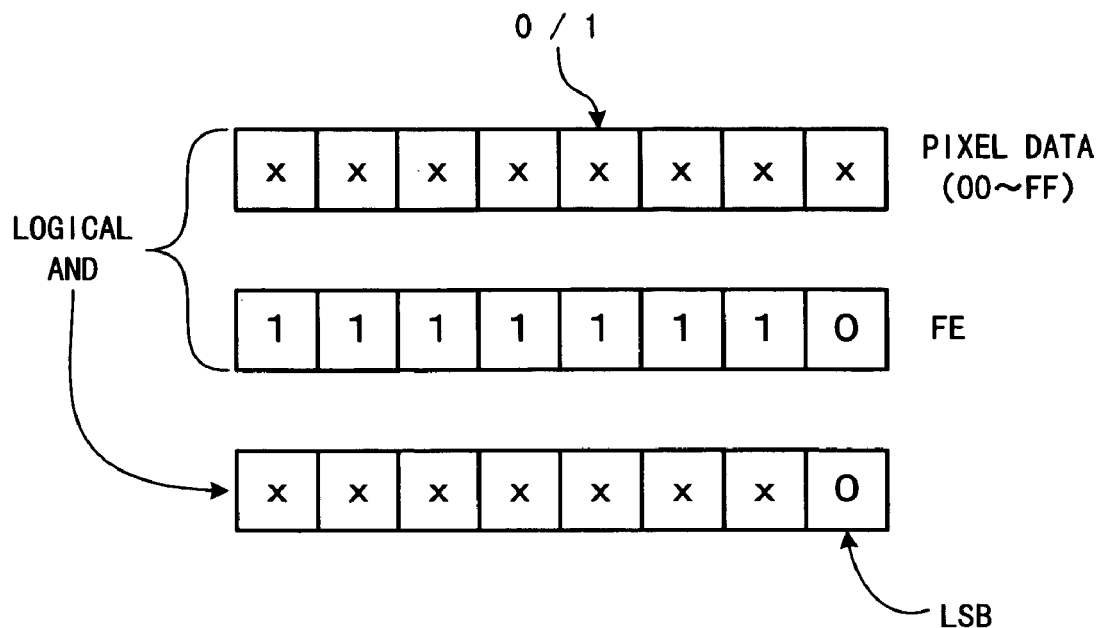
FIG. 6 is a diagram for explaining an operation to set the least significant bit of pixel data to 0.

Data of each pixel, which is one byte, assumes any hexadecimal value from 00 to FF. As a result of the logical AND operation of the data with the hexadecimal value FE, pixel data with only the least significant bit set to 0 is obtained (FIG. 6).

Figure 7:
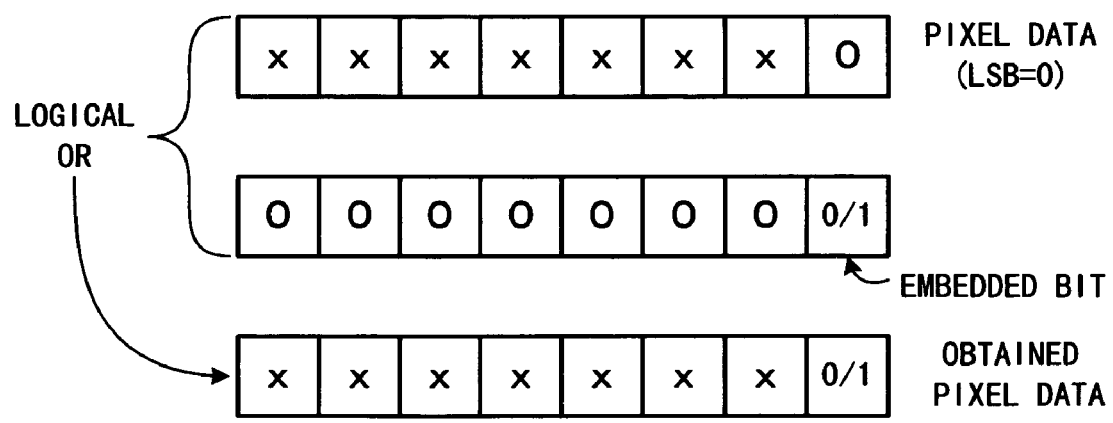
FIG. 7 is a diagram for explaining the principle to embed processing information in the least significant bit of pixel data, which was set to 0 in FIG. 6.

As a result of the logical OR operation of bits of the above packed data and pixel data with the least significant bit set to 0, pixel data with necessary data embedded will be obtained (FIG. 7).

The subroutine transfers the obtained data to the image memory (step S16) and exits in step S17.

Since processing information is written dispersively in this way and only the least significant bit of image data changes, there is no substantial reduction in image quality.

Second Embodiment

In the above-mentioned embodiment (first embodiment), an image is manipulated in the same way for each plane of R, G, and B colors. Consequently, the processing information may be visible on faint images. In a second embodiment, this drawback is eliminated by making the processing information more inconspicuous.

FIGS. 8, 9, and 10 are tables showing the positions of pixels to which processing information is written, with respect to R, G, and B planes.

As shown in the tables, the positions of pixels in which processing information is embedded are reversely shifted five pixels relative to the R plane, in the case of the G and B planes.

By this arrangement, processing information is embedded more dispersively, making the existence of the processing information more inconspicuous.

Even in an image to which no processing information is written, pixel data at the above-mentioned positions may happen to be arranged meaningfully. At this time, the pixel data may be read mistakenly as information. In this embodiment, identical information is written to each of the R, G, and B planes. During reading of the information, by checking whether these information pieces match, such an accident can be eliminated.

Third Embodiment

The second embodiment provides for the case where given information is visible as noise. However, since the 44 bits may accidentally form a meaningful data array, in the third embodiment, as shown in FIGS. 11, 12, and 13, five bits are added as parity data to make 49-bit configuration.

Fourth Embodiment

In the embodiments that have been heretofore described, the positions of pixels to embed processing information in are fixed. In this embodiment, several patterns of these positions are provided, and a pattern can be selected from these patterns so that influence on the image is minimized.

Although the least significant bit of image data is modified in the above-mentioned first to fourth embodiments, other than the least significant bit may be modified if the modification is inconspicuous. For example, if the range of intensity of image is wide (e.g., 16 bits), the second or third bit position from the least significant bit position may be modified. Also, if resolution is high, a higher bit position may be modified because modification of a single pixel is inconspicuous.

As seen in these embodiments, since information is embedded in image data itself, various information can be recorded regardless of the formats of image files.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An image processing apparatus, comprising:
   a processor for performing image processing on original image data to obtain processed image data, the original image data and the processed image data being comprised of a plurality of pixels, each of which is expressed by using multiple bits,
   wherein the processor embeds bits obtained by dividing plural bits of data, which describe information relating to the image processing performed on said original image data, in a part of the multiple bits expressing each of the pixels of said processed image data dispersed at a plurality of predetermined positions on an image represented by said processed image data.

2. An image processing apparatus according to claim 1, wherein said information relating to the image processing performed on said original image data describes the contents of image processing performed on said original image data to obtain said processed image data.

3. An image processing apparatus according to claim 1, wherein said information relating to the image processing performed on said original image data describes a time when said image processing is performed on original image data to obtain said processed image data.

4. An image processing apparatus according to claim 1, wherein said information relating to the image processing performed on said original image data describes a time when said bits are dispersed.

5. An image processing method comprising:
   obtaining processed image data by performing image processing on original image data, the original image data and the processed image data being comprised of a plurality of pixels, each of which is expressed by using multiple bits; and
   embedding bits, which describe information relating to the image processing performed on said original image data, and are obtained by dividing plural bits of data, in a part of the multiple bits expressing each of the pixels of said processed image data dispersed at a plurality of predetermined positions on an image represented by said processed image.

6. An image processing method according to claim 5, wherein said information relating to the image processing performed on said original image data describes the contents of image processing performed on said original image data to obtain said processed image data.

7. An image processing method according to claim 5, wherein said information relating to the image processing performed on said original image data describes a time when the processed image data is obtained.

8. An image processing method according to claim 5, wherein said information relating to the image processing performed on said original image data describes a time when bits for describing information different from information of said processed image data are dispersed.

9. A recording medium in which a program for a computer is stored, wherein said program is one that enables the computer to perform the following processing:
   image processing on original image data to obtain processed image data, the original image data and the processed image date being comprised of a plurality of pixels, each of which is expressed by using multiple bits, wherein bits, which describe information relating to the image processing performed on said original image data, and are obtained by dividing plural bits of data, are embedded in a part of the multiple bits expressing each of the pixels of said processed image data dispersed at a plurality of predetermined positions on an image represented by said processed image.

10. A recording medium according to claim 9, wherein said information relating to the image processing performed on said original image data describes the contents of image processing performed on said original image data to obtain said processed image data.

11. A recording medium according to claim 9, wherein said information relating to the image processing performed on said original image data describes a time when said image processing is performed on original image data to obtain said processed image data.

12. A recording medium according to claim 9, wherein said information relating to the image processing performed on said original image data describes a time when said bits are dispersed.

13. An image processing method comprising:
obtaining processed image data by performing image processing on original image data, the original image data and the processed image date being comprised of a plurality of pixels, each of which is expressed using multiple bits; and
embedding bits, obtained by dividing plural bits of data, for describing information relating to the image processing performed on said original image data, in a part of the multiple bits expressing each of the pixels of said processed image data dispersed at a plurality of predetermined positions on an image represented by said processed image data, each of the pixels of said processed image dispersed at the predetermined positions being separated by at least one pixel from the rest of the predetermined pixels.

14. An image processing method according to claim 13, wherein the part of the multiple bits expressing each of the pixels of said processed image data is the least significant bit of each of the pixels of said processed image data.

15. An image processing apparatus according to claim 1, wherein the positions of pixels in which the bits are embedded is decided in accordance with a predetermined procedure irrespective of pixel data.

16. An image processing apparatus according to claim 1, wherein the positions of pixels in which the bits are embedded is predetermined fixed positions irrespective of pixel data.

17. An image processing apparatus according to claim 1, wherein the positions of pixels in which the bits are embedded is a predetermined position.

18. An image processing apparatus according to claim 1, wherein the part of the multiple bits expressing each of the pixels of said processed image data is the least significant bit of each of the pixels of said processed image data.

19. An image processing method according to claim 5, wherein the part of the multiple bits expressing each of the pixels of said processed image data is the least significant bit of each of the pixels of said processed image data.

20. A recording medium according to claim 9, wherein the part of the multiple bits expressing each of the pixels of said processed image data is the least significant bit of each of the pixels of said processed image data.

* * * * *